(12) United States Patent     (10) Patent No.:   US 12,700,074 B2

Kozma et al.     (45) Date of Patent:     Aug. 4, 2026

(54) METHOD, DATA PROCESSING SYSTEM, COMPUTER PROGRAM PRODUCT AND COMPUTER READABLE MEDIUM FOR DETERMINING IMAGE SHARPNESS

(71) Applicant: aiMotive Kft., Budapest (HU)

(72) Inventors: Péter Dániel Kozma, Budapest (HU); Mátyás Léránt-Nyeste, Budapest (HU)

(73) Assignee: aiMotive Kft., Budapest (HU)

( * ) Notice: Subject to any disclaimer, the term of this patent is extended or adjusted under 35 U.S.C. 154(b) by 289 days.

(21) Appl. No.: 18/559,741

(22) PCT Filed: May 9, 2022

(86) PCT No.: PCT/HU2022/050043

§ 371 (c)(1),
(2) Date: Nov. 8, 2023

(87) PCT Pub. No.: WO2022/238724

PCT Pub. Date: Nov. 7, 2022

(65) Prior Publication Data

US 2024/0233104 A1    Jul. 11, 2024

(30) Foreign Application Priority Data

May 10, 2021   (HU) ...................................... 2100190

(51) Int. Cl.
   *G06T 7/00*      (2017.01)
   *G06T 7/33*      (2017.01)
   *G06T 11/26*     (2026.01)
(52) U.S. Cl.
   CPC ............ *G06T 7/0002* (2013.01); *G06T 7/344* (2017.01); *G06T 11/26* (2026.01); *G06T 2207/30168* (2013.01)

(58) Field of Classification Search
   CPC ......... G06T 7/0002; G06T 2207/30168; G06T 11/206; G06T 7/344; G06T 5/73;
     (Continued)

(56) References Cited

U.S. PATENT DOCUMENTS

| | | | |
|---|---|---|---|
| 10,574,980 B1* | 2/2020 | Batiz | ....................... G06T 7/248 |
| 2004/0120598 A1* | 6/2004 | Feng | ......................... G06T 5/73 |
| | | | 382/263 |

(Continued)

FOREIGN PATENT DOCUMENTS

| | | |
|---|---|---|
| CA | 2562480 A1 | 3/2008 |
| KR | 101570602 B1 | 11/2015 |

OTHER PUBLICATIONS

Minin, P., & Shumilov, Y. (2017). Sharpness estimation in facial images by spectrum approximation. Signal, Image and Video Processing, 11(1), 163-170. (Year: 2017).*

(Continued)

*Primary Examiner* — Utpal D Shah
*Assistant Examiner* — Jack Peter Kraynak
(74) *Attorney, Agent, or Firm* — Wood Herron & Evans LLP

(57) ABSTRACT

The invention is a method for determining whether an input image is sufficiently sharp, comprising the steps of
   providing a blur score threshold value,
   inputting the input image to an image processing system,
   generating, by the image processing system, a two-dimensional frequency spectrum of the input image,
   generating a one-dimensional frequency spectrum from the two-dimensional frequency spectrum,
   fitting a straight line on the one-dimensional frequency spectrum, and
   determining a blur score value based on a residual of the fitting, and considering the input image as sufficiently (Continued)

sharp based on a comparison of the blur score value with the blur score threshold value.

The invention further relates to a data processing system, a computer program product and a computer readable medium carrying out the above method.

17 Claims, 4 Drawing Sheets

(58) Field of Classification Search
CPC ..................... G06T 7/001; G06T 7/262; G06T 2207/20048; G06T 2207/20052; G06T 2207/20056; G06T 2207/2006
See application file for complete search history.

(56) References Cited

U.S. PATENT DOCUMENTS

| | | | |
|---|---|---|---|
| 2004/0156559 A1 | 8/2004 | Cheng et al. | |
| 2005/0099536 A1* | 5/2005 | Zhu | G06T 5/20 |
| | | | 348/448 |
| 2007/0252907 A1* | 11/2007 | Hsu | H04N 23/64 |
| | | | 348/E5.045 |
| 2008/0226148 A1* | 9/2008 | Gu | G06T 5/90 |
| | | | 382/128 |
| 2010/0246977 A1* | 9/2010 | Fu | G06T 7/0012 |
| | | | 382/218 |
| 2012/0082385 A1* | 4/2012 | Xu | G06V 30/2504 |
| | | | 382/199 |
| 2014/0003734 A1 | 1/2014 | Umansky et al. | |
| 2017/0178296 A1* | 6/2017 | Li | G03B 13/36 |
| 2019/0215438 A1* | 7/2019 | Lee | H04N 17/002 |
| 2021/0264587 A1* | 8/2021 | Kobayashi | G03F 7/70625 |

OTHER PUBLICATIONS

E. Mavridaki and V. Mezaris, "No-reference blur assessment in natural images using Fourier transform and spatial pyramids," 2014 IEEE International Conference on Image Processing (ICIP), Paris, France, 2014, pp. 566-570, doi: 10.1109/ICIP.2014.7025113. (Year: 2014).*

M. S. Hosseini, J. A. Z. Brawley-Hayes, Y. Zhang, L. Chan, K. N. Plataniotis and S. Damaskinos, "Focus Quality Assessment of High-Throughput Whole Slide Imaging in Digital Pathology," in IEEE Transactions on Medical Imaging, vol. 39, No. 1, pp. 62-74, Jan. 2020, doi: 10.1109/TMI.2019.2919722. (Year: 2020).*

C. T. Vu, T. D. Phan and D. M. Chandler, "S3 : a Spectral and Spatial Measure of Local Perceived Sharpness in Natural Images," 2012. (Year: 2012).*

Minin Peter et al: "Sharpness estimation in facial images by spectrum approximation", Signal Image and Video Processing, Springer London, London, vol. 11, No. 1, Jul. 5, 2016, pp. 163-170.

Lu Qingbo et al: "A no-reference Image sharpness metric based on structural information using sparse representation", Information Sciences, Elsevier, Amsterdam, NL, vol. 369, Jun. 27, 2016, pp. 334-346.

PCT/HU2022/050043 International Preliminary Report on Patentability dated Apr. 25, 2023.

PCT/HU2022/050043 International Search Report dated Aug. 25, 2022.

* cited by examiner

10

20

10'                    20'

METHOD, DATA PROCESSING SYSTEM, COMPUTER PROGRAM PRODUCT AND COMPUTER READABLE MEDIUM FOR DETERMINING IMAGE SHARPNESS

This application claims priority, as a national phase application under Section 371, to PCT Application No. PCT/HU2022/050043, filed May 9, 2022, which claims priority to Hungarian Application No. P2100190, filed May 10, 2021, each of which is expressly incorporated by reference herein, in its entirety.

TECHNICAL FIELD

The invention relates to a method for determining whether an input image is sufficiently sharp, e.g., to ensure that the input image comprises enough details or information for a planned application or further image processing. The invention also relates to a data processing system, a computer program product and a computer readable medium implementing the method.

BACKGROUND ART

Measuring or determining the sharpness of an image is used in various applications. Applications such as medical applications or applications related to autonomous driving usually require a higher level of sharpness as an insufficiently sharp image might lead to wrong decisions and cause health risks or accidents. Blurry images (images having a blur), i.e., images lacking sharpness usually have poorly defined edges, indistinct bright and shadowed areas, etc. Possible causes of blurry images are summarized in CA 2 562 480 A1, and the causes include the camera being out of focus, or mistakenly focused on the foreground or background, or a best focus is set for a specific distance thus objects at other distances are out of focus; movement of the camera or the objects when the image is taken (motion blur), digitalizing or post-processing of the image. Blurry images can make edge detection tasks or segmentation tasks more difficult to perform, because blurriness also increase the uncertainty of the results.

US 2004/0120598 A1 discloses a blur detection system for estimating and reducing image blur in digital images. Digital images are usually stored encoded by the forward discrete cosine transform (DCT). As a blur indicator a single DCT coefficient, a set of DCT coefficients or a comparison of one or more DCT coefficients to other DCT coefficients is used. Each DCT coefficient is associated with its corresponding frequency component and this way a two-dimensional histogram is generated. The two-dimensional (2D) histogram is then reduced to a one-dimensional (1D) histogram, similar to a radial frequency spectrum. Blur indicators are determined form the 1D histogram, e.g., by using a maximum DCT coefficient in a region of the image, or by using a ratio of the standard deviation of a first region to the standard deviation to another region, wherein high ratio indicates a blurred image and low ratio indicates a focused image.

US 2004/0156559 A1 discloses a method and apparatus for measuring a quality of compressed video sequences without using a reference, thus the quality information is derived directly from the individual image frames. The image frames are transformed by a Fast Fourier Transform (FFT), and a ratio between an accumulated mid to high frequency amplitude and an accumulated low frequency amplitude is determined. This ratio is used to determine the image sharpness as low ratios indicate that more low-frequency components are present in the image, thus the image may appear blurry.

US 2014/0003734 A1 discloses a system for estimating a blur value based on detected edges within an input image and spectral energy information of the input image in the frequency domain. The image is transformed from the spatial domain to the frequency domain and the frequency components are analyzed based on a model for classifying blurry and non-blurry (sharp) images. A 2D power spectrum of the input image is calculated, from which a directionally independent 1D spectrum is calculated. The 2D spectrum is divided into circular regions corresponding to low, mid, and high frequency regions, and a blur value is determined based on the counts in each region. Alternatively, edge detection is used to determine the blur value.

KR 10-1570602 B1 discloses a method for measuring the sharpness of an image, wherein the decision whether the image is sharp or not is based on a 2D spectrum generated by a discrete Fourier transform. Directional information is also used to determine the sharpness of the image.

In view of the known approaches, there is a need for a method by the help of which a decision on the sharpness of the image can be made, regardless of the content, objects of the image. Known approaches that are using edge detection to complement the determination whether an image is sharp enough are highly dependent on the content of the image, thus the content can influence the decision on the sharpness. If equally sharp images capture different scenes, for example one scene with only a few objects and an other one with more objects, it will result in a different amount of detected edges, thus the decision based on the detected edges can also be different. For this reason, methods based on edge detection cannot be used directly for unknown or dynamically changing scenes. Furthermore, for dynamically changing scenes a reliable method allowing a real-time sharpness determination is needed.

Some of the other known approaches are using machine learning tools to determine whether an image is sharp enough or not. The use of machine learning tools requires a significant amount of training data, and also a separate classification of the training data, which requires a significant amount of time and effort. For the above reasons, a solution that gives an accurate and objective decision more easily and quickly is strongly required.

DESCRIPTION OF THE INVENTION

The primary object of the invention is to provide a method for determining whether an image is sharp or not, which is free of the disadvantages of prior art approaches to the greatest possible extent.

The object of the invention is to provide a method by the help of which the decision on the sharpness of the image can be made in a more efficient way than the prior art approaches regardless of the content of the image. Accordingly, the object of the invention is to provide a reliable method that is capable of determining whether an image is sufficiently sharp or not.

The further object of the invention is to provide a data processing system that comprises means for carrying out the steps of the method according to the invention.

Furthermore, the object of the invention is to provide a non-transitory computer program product for implementing the steps of the method according to the invention on one or more computers and a non-transitory computer readable medium comprising instructions for carrying out the steps of the method on one or more computers.

The objects of the invention can be achieved by the method according to claim 1. The objects of the invention can be further achieved by the data processing system according to claim 14, by the non-transitory computer program product according to claim 15, and by the non-transitory computer readable medium according to claim 16. Preferred embodiments of the invention are defined in the dependent claims.

The main advantage of the method according to the invention compared to prior art approaches comes from the fact that it can decide whether an image is sufficiently sharp in a quick and easy manner, which can also allow a real-time decision. Such a quick decision on the one hand allows a continuous analysis of images originating from a camera stream, or on the other hand it also allows a readjustment of the camera or its settings in order to capture sufficiently sharp images.

It has been recognized that a one-dimensional frequency spectrum generated from a two-dimensional frequency spectrum of the image, especially a shape or envelope of the one-dimensional frequency spectrum, corresponds to the sharpness of the image. It has been found that sufficiently sharp images result in a one-dimensional frequency spectrum having a smooth envelope, while blurry images tend to result in a one-dimensional frequency spectrum having a less smooth envelope, i.e., the envelope includes some structures. For this reason, when a straight line is fitted on the one-dimensional frequency spectrum, sharp images have a relatively good fit, contrary to blurry images having a less good fit. A residual of the fit can characterize the quality of the fit, thus it can be used as a parameter on which a decision on the sharpness of the image can be based. This parameter, for example, can be compared to a threshold or a series of thresholds corresponding to a scale of sharpness.

Certain embodiments of the method according to the invention are capable of generating such a threshold based on the image itself.

A further advantage of the method according to the invention is that it has a limited computational need which allows for making real-time decision on the sharpness of the image. Due to the limited computational needs, the method according to the invention can be run twice for each input image, once for the original input image and once for a blurred version of the input image (blurred image), still allowing a real-time decision-making. Advantageously, the method according to the invention does not rely on the content of the image, i.e., it is scene-independent, and thus, the method can be used for an image capturing any kinds of scenes.

The method according to the invention therefore can be used in any vision-based scene understanding system, including medical applications (medical image processing) or improving the vision of self-driving or autonomous vehicles.

BRIEF DESCRIPTION OF THE DRAWINGS

Preferred embodiments of the invention are described below by way of example with reference to the following drawings, where.

MODES FOR CARRYING OUT THE INVENTION

The invention relates to a method for determining whether an input image 10 is sufficiently sharp. A level of sufficient sharpness can depend on the specific application of the method, e.g., medical applications or applications related to autonomous driving might require a higher level of sharpness as image sharpness can directly affect a decision based on the input image 10, and thus, an insufficiently sharp image might cause health risks or accidents. Based on the decision, input images 10 having an insufficient sharpness can be labelled (flagged) accordingly or even disregarded for certain applications, or a warning signal can be generated. Furthermore, the level of sufficient sharpness can be set for each application independently.

According to the invention, the method for determining whether an input image 10 is sufficiently sharp comprises a step of providing a blur score threshold value for the input image 10. The blur score threshold value is preferably a value that differentiates whether the input image 10 is sufficiently sharp or its sharpness is insufficient for the planned application. The step of providing the blur score threshold value preferably comprises a decision made on the basis of empirical data between a first scenario and a second scenario. In said first scenario, the blur score threshold value is a predetermined value, and in said second scenario, the blur score threshold value is determined by further steps based on the input image 10 itself.

In the first scenario, wherein the blur score threshold value is a predetermined value, it is preferably determined on the basis of empirical data, such as camera type or camera settings of a camera recording the input image 10, lighting conditions at the time of recording the input image 10, content or the expected content of the input image 10. In the second scenario the blur score threshold value can be directly determined based on the input image 10 itself.

Figure 8:
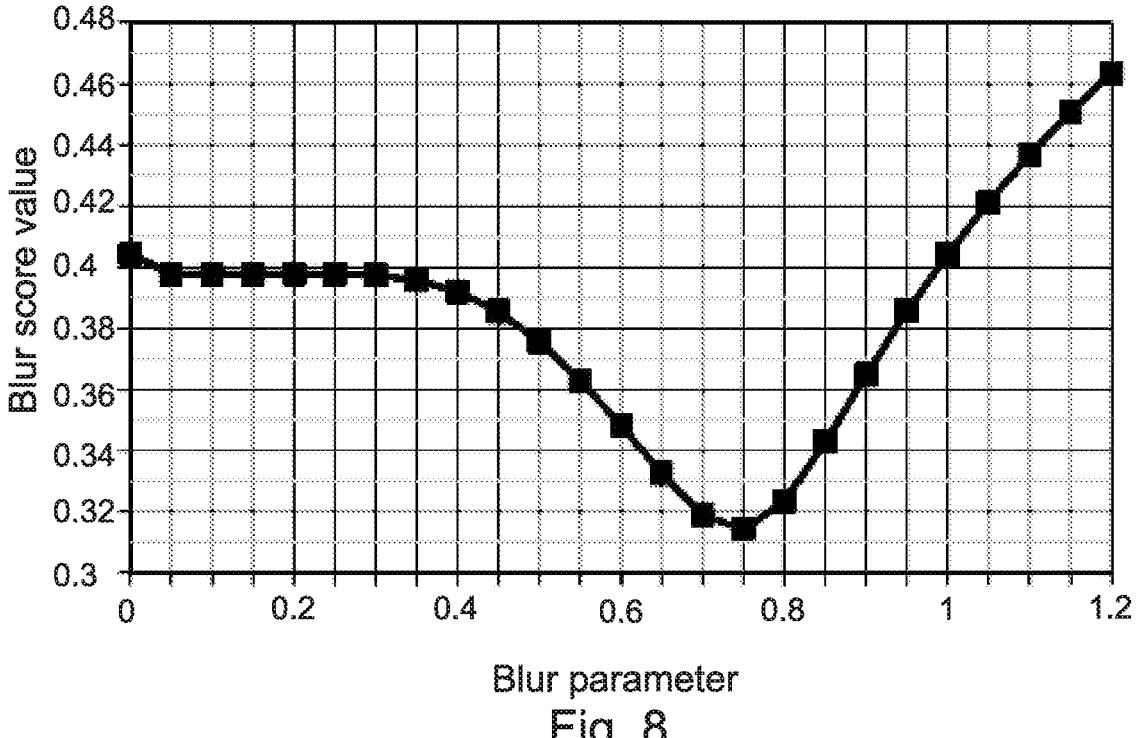
FIG. 8 is the evolution of the blur score value as a function of a blur parameter indicating a degree of blurring of an input image.

The first scenario preferably corresponds to applications, where only a limited amount of blurring is expected on the input images 10 (i.e., wherein the blurriness of the input image 10 corresponds to a blur parameter in a range up to 0.95 of FIG. 8). Thus, in the first scenario, empirically determined (predetermined) blur score threshold values can be used. The first scenario, for example, relates to cases, wherein the input images 10 are recorded by a camera of a self-driving car in a daytime in good weather conditions, thus the input images 10 recorded by the camera are expected to have a similar sharpness. In such a scenario, an empirically predetermined blur score threshold value can be provided for the input images 10, preferably based on the camera type and camera settings. In a preferred embodiment, in the first scenario, a same blur score threshold value can be provided for all the input images 10.

Preferably, the predetermined blur score threshold value is determined based on a gain of the camera that relates to the noise of the input image 10. In a preferred embodiment a set of predefined blur score threshold values are provided for different camera settings or imaging conditions, and an appropriate blur score threshold value is selected for each input image 10 or for each set of input images 10. By using a predetermined blur score threshold value, input images 10 having a blurriness corresponding to a blur parameter in a range up to 0.3 or 0.4 (i.e., a very slight blurring that cannot be seen by a naked human eye) are preferably classified as sufficiently sharp. When, however, even such input images 10 are to be differentiated by the method according to the invention, the second scenario can be chosen.

The second scenario preferably corresponds to applications, where the blurriness of the input images 10 can vary in a wider range, thus, the blur score threshold values are preferably determined based on the input image 10 itself. The second scenario, for example, relates to cases, wherein the input images 10 can be recorded by a camera of a self-driving car in a nighttime or in bad weather conditions (e.g., in rain), or wherein there is no a priori knowledge about the quality of the input images 10, thus the sharpness or blurriness of the recorded input images 10 can vary in a wider range, therefore a more robust classification method is needed. In such a scenario, the blur score threshold value is preferably provided for each input image 10 individually, based on the input image 10 itself. Thus, the second scenario, wherein the blur score threshold value is calculated based on the input image 10 itself can also be used for any kinds of input images 10, i.e., for input images 10 recorded in any weather or image conditions (including good and bad conditions).

Figure 1:
FIG. 1 is an example of an input image.
Figures 3A, 3B:
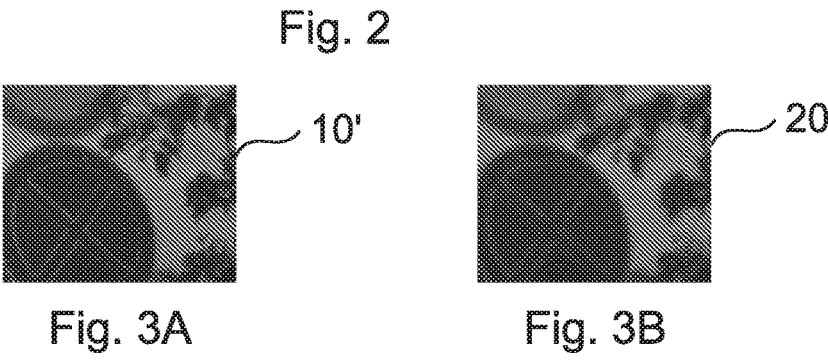

The method according to the invention also comprises a step of inputting the input image 10 to an image processing system. An exemplary input image 10 is shown in FIG. 1. An enlarged detail 10' of the input image 10 of FIG. 1 is shown in FIG. 3A. The input image 10 can be an image taken by a digital camera or it can also be a digitized (e.g., scanned) photo, furthermore, the input image 10 can be a frame of a camera stream, and the input image 10 can also be a raw image or a pre-processed image.

The method according to the invention further comprises a step of generating a two-dimensional frequency spectrum 12 (see FIG. 4 for an example) of the input image 10, wherein the two-dimensional frequency spectrum 12 is generated by the image processing system. The two-dimensional frequency spectrum 12 of the input image 10 is preferably generated by applying a two-dimensional Fourier-transform, such as a Fast Fourier Transform, or by a two-dimensional wavelet transform, such as a discrete cosine transform on the input image 10.

Due to the applied two-dimensional Fourier-transform, the method according to the invention can also handle input images 10, wherein at least part of the input image 10 is blurry (for example, when a close object is captured on the input image 10 that is not an intended content of the input image 10). Even in such cases, the rest of the input image 10 can still contain high-, medium-, and low-frequency components, thus the method according to the invention is capable to determine whether the majority of the input image 10 is sufficiently sharp. In cases, when the largest part of the input image 10 is covered by a blurry object, then the method might classify the input image as not sufficiently sharp, and thus may suggest against drawing meaningful conclusions from said input image 10. This feature also fits well with the intended use and application of the method according the invention, where unclear, blurry images can be avoided. In cases, where further use of input images 10 having sharp parts and unclear (blurry) parts are to be avoided regardless of the overall sharpness of the input image 10, then in such cases the input images 10 can be filtered by other methods, for example by applying edge detection to the input image 10.

From the two-dimensional frequency spectrum 12 a one-dimensional frequency spectrum 14 is generated as detailed below and a straight line 16 is fitted on the one-dimensional frequency spectrum 14 (see FIG. 6 for an example). The straight line 16 is preferably fitted by a linear regression method, and a blur score value is determined based on a residual of the fitting. The residual is preferably a distance of the data points of the one-dimensional frequency spectrum 14 and the fitted straight line 16, wherein the distance is preferably determined in any known metrics, for example the distance is a Euclidean distance or a squared Euclidean distance. The blur score value was found to be higher for blurry images than for sharp images, thus, the input image 10 is considered as sufficiently sharp if the blur score value is below the blur score threshold value. The blur score value is independent from the actual scene of the input image 10, therefore the method according to the invention can be used for a continuous sharpness monitoring, i.e., for input images 10 originating from a camera stream, even in cases when the camera stream captures dynamically changing scenes.

A two-dimensional frequency spectrum 12 usually comprises a two-dimensional amplitude spectrum and a two-dimensional phase spectrum, the two of which together describe the input image 10 univocally. Preferably, the one-dimensional frequency spectrum 14 is generated from the two-dimensional amplitude spectrum of the two-dimensional frequency spectrum 12, wherein the two-dimensional amplitude spectrum comprises amplitudes of spatial frequencies. The two-dimensional phase spectrum preferably can be omitted for determining the one-dimensional frequency spectrum 14.

The one-dimensional frequency spectrum 14 can be generated from the two-dimensional frequency spectrum 12 or the two-dimensional amplitude spectrum by applying any two-dimension to one-dimension binary relation, wherein the resulting one-dimensional frequency spectrum 14 is ordered by frequencies. As an example, the one-dimensional frequency spectrum 14 is generated by frequency mapping, or by taking one or more slices of the two-dimensional frequency spectrum 12 or the two-dimensional amplitude spectrum.

Preferably, a logarithm of the two-dimensional amplitude spectrum is calculated, and the one-dimensional frequency spectrum 14 is generated from the logarithm of the two-dimensional amplitude spectrum. By calculating the logarithm of the two-dimensional amplitude spectrum, frequencies having lower amplitudes and higher amplitudes are more equally represented in the one-dimensional frequency spectrum 14.

The one-dimensional frequency spectrum 14 is alternatively a histogram having bins corresponding to frequency ranges of the two-dimensional frequency spectrum 12 and histogram values for each bin, wherein each histogram value is preferably an average amplitude or an integrated amplitude within the corresponding frequency range.

Figure 4:
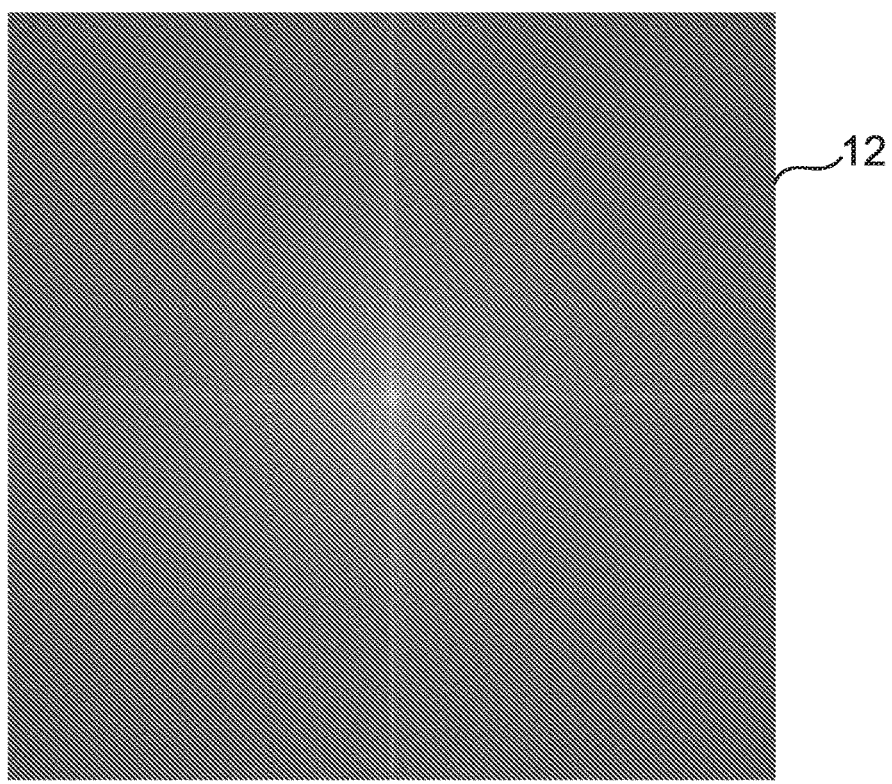
FIG. 4 is an exemplary two-dimensional spectrum of the input image of FIG. 1.
Figure 5:
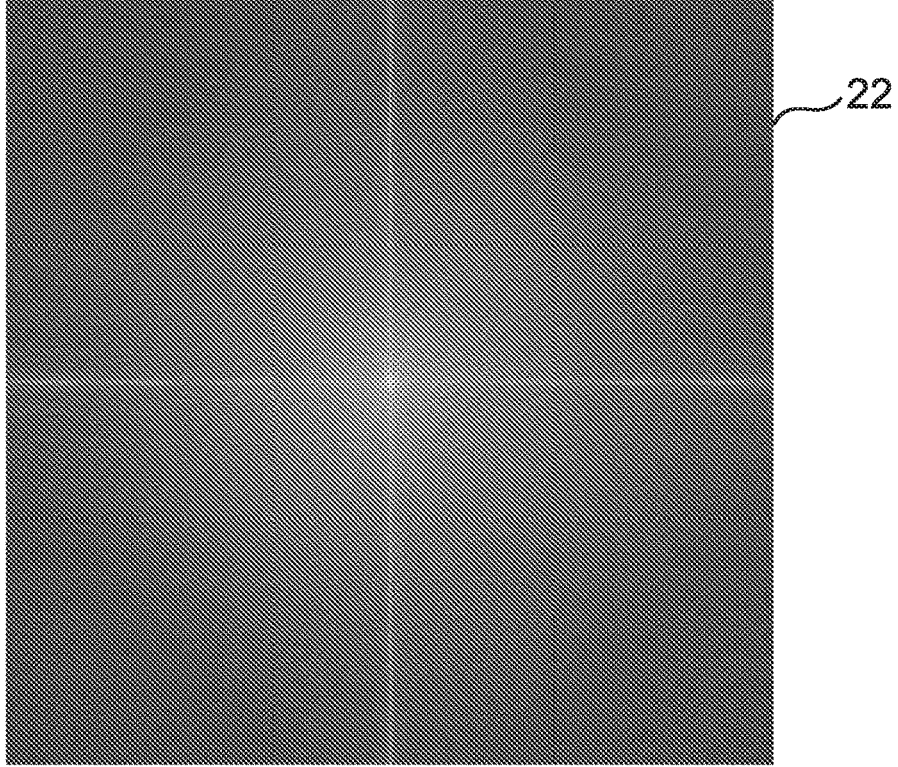
FIG. 5 is an exemplary two-dimensional spectrum of the blurred image of FIG. 2.

Preferably, the two-dimensional frequency spectrum 12 is centralized, i.e., the frequency corresponding to a zero frequency is arranged in a centre of the spectrum and frequencies increase radially outwards from the centre (just like in FIGS. 4 and 5). The one-dimensional frequency spectrum 14 in such a case is preferably generated by radial averaging or by taking a radial slice of the two-dimensional frequency spectrum 12, or of the two-dimensional amplitude spectrum.

Besides determining the blur score threshold value on the basis of empirical data (in a first scenario), the blur score threshold value can also be determined on the basis of the input image 10 itself by the following steps (in a second scenario). Preferably, a blurred image 20 (see FIG. 2 for an example) is generated from the input image 10, preferably by a Gaussian blurring, wherein the Gaussian function has a standard deviation in the range of 0.01-2. By the use of the image processing system, a further two-dimensional frequency spectrum 22 (see FIG. 5 for an example) of the blurred image 20 is generated, and preferably, the further two-dimensional frequency spectrum 22 is generated the same way as the two-dimensional frequency spectrum 12, i.e., by using a same transform, i.e., a same two-dimensional Fourier transform or a same two-dimensional wavelet transform. From the further two-dimensional frequency spectrum 22 a further one-dimensional frequency spectrum 24 (see FIG. 7 for an example) is generated, and a further straight line 26 (see FIG. 7 for an example) is fitted on the further one-dimensional frequency spectrum 24. Preferably, the further one-dimensional frequency spectrum 24 is generated the same way as the one-dimensional frequency spectrum 14, and the further straight line 26 is fitted the same way as the straight line 16, i.e., by applying the same fitting method, for example, the same linear regression method. A residual of the fitting of the further straight line 26 is calculated, wherein the residual is the blur score threshold value. Again, the residual is preferably calculated with the same metrics as for the fitting of the straight line 16. By using the same methods and parameters for generating the blur score value of the input image 10 and the blur score threshold value from the blurred image 20 the blur score value and the blur score threshold value can be easily compared.

The comparison between the blur score value and the blur score threshold value can preferably be implemented based on a difference score value, which is generated by subtracting the blur score threshold value from the blur score value, wherein difference score values having a positive value or a non-negative value indicate that the input image 10 is sufficiently sharp, and difference score values having a negative value indicate that the input image 10 is not sufficiently sharp, i.e., blurry.

An other way of comparison of the blur score value and the blur score threshold value is to generate a score ratio, wherein the score ratio is generated by dividing the blur score value with the blur score threshold value, and score ratios having a value greater than 1 or not less than 1 indicate that the input image 10 is sufficiently sharp, and score ratios having a value less than 1 indicate that the input image 10 is blurry.

A detailed example for the method according to the invention is described below in connection with FIGS. 1 to 7.

FIG. 1 illustrates an input image 10, which is taken by a camera of a vehicle, preferably of an autonomous vehicle. A two-dimensional Fourier transform, in this example a two-dimensional fast Fourier transform (FFT), has been used to generate a two-dimensional frequency spectrum 12 from the input image 10. The two-dimensional frequency spectrum 12 is shown in FIG. 3, wherein the two-dimensional frequency spectrum 12 is centralized, i.e., a centre of the two-dimensional frequency spectrum 12 corresponds to zero frequency, from which the frequency increases radially outwards. Sharp details on the input image 10 correspond to higher spectrum values at higher frequencies; blurring of an input image 10 suppresses spectrum values at higher frequencies.

Figure 2:
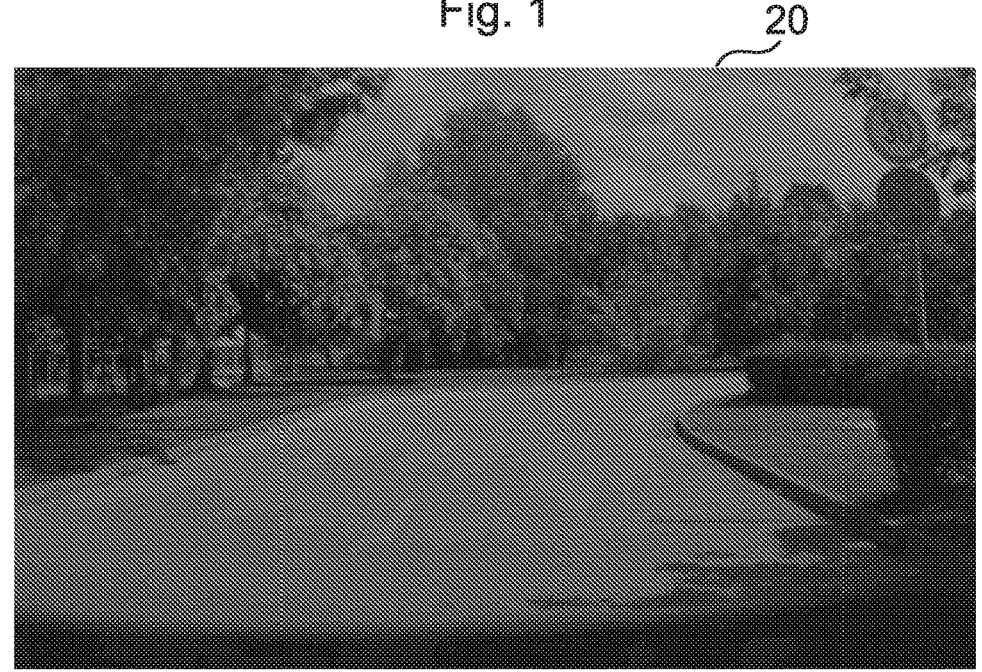
FIG. 2 is an example of a blurred image generated from the input image of FIG. 1, FIG. 3A and FIG. 3B are enlarged details of FIG. 1 and FIG. 2, respectively.

FIG. 2 illustrates a blurred image 20 generated from the input image 10 of FIG. 1 by Gaussian blurring, wherein a standard deviation of the Gaussian blurring was chosen to be 0.7. FIGS. 3A and 3B shows enlarged details 10', 20' of FIGS. 1 and 2, respectively, from which it can clearly be seen that the input image 10 shown in FIG. 1 and FIG. 3A is sharper than the blurred image 20, i.e., the edges of the objects on FIG. 2 and FIG. 3B are less distinct.

FIG. 4 is a two-dimensional frequency spectrum 12 generated by an image processing system based on the input image 10 of FIG. 1, and FIG. 5 is a further two-dimensional frequency spectrum 22 generated by the image processing system based on the blurred image 20 of FIG. 2.

The two-dimensional frequency spectrum 12 and the further two-dimensional frequency spectrum 22 are both centralized spectrums generated by a two-dimensional FFT transform applied on the input image 10 and on the blurred image 20, respectively. It can be seen from a comparison of FIG. 4 and FIG. 5 that the further two-dimensional frequency spectrum 22 generated from the blurred image 20 contains less high-frequency components, due to the fact that sharp details result in high-frequency components, which are reduced by blurring, thus, the further two-dimensional frequency spectrum 22 decays faster towards higher frequencies (i.e., towards the peripheries of the further two-dimensional frequency spectrum 22) than the two-dimensional frequency spectrum 12.

Figure 6:
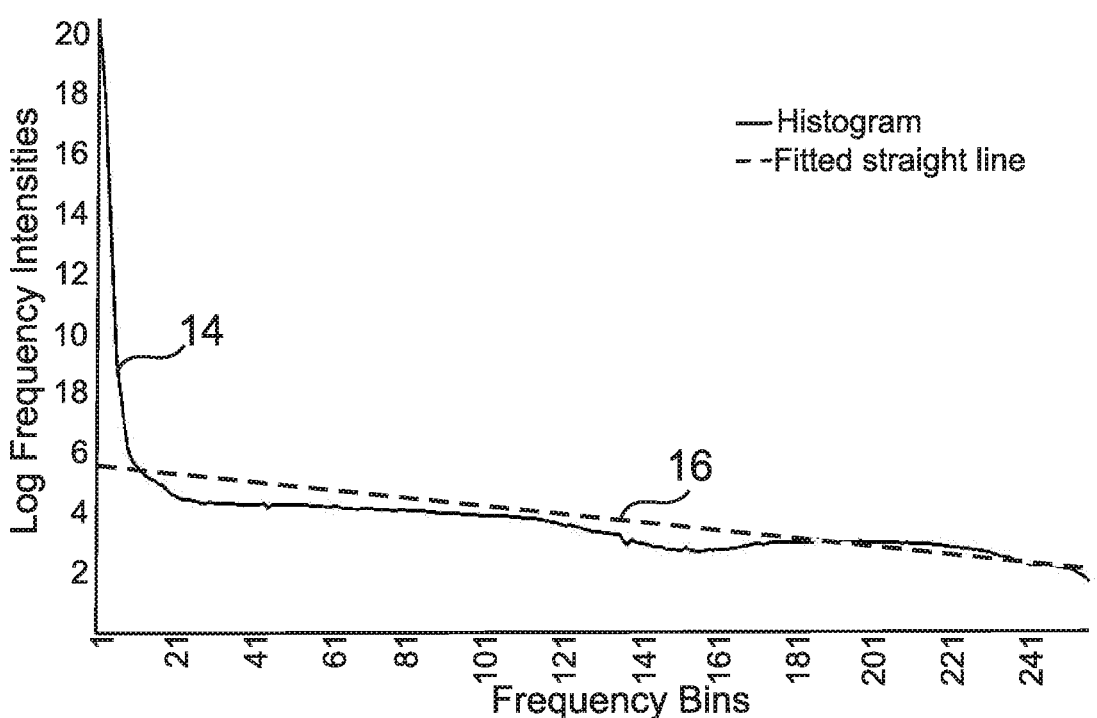
FIG. 6 is an exemplary one-dimensional spectrum (a histogram) generated from FIG. 4, and a straight line fitted on the histogram.
Figure 7:
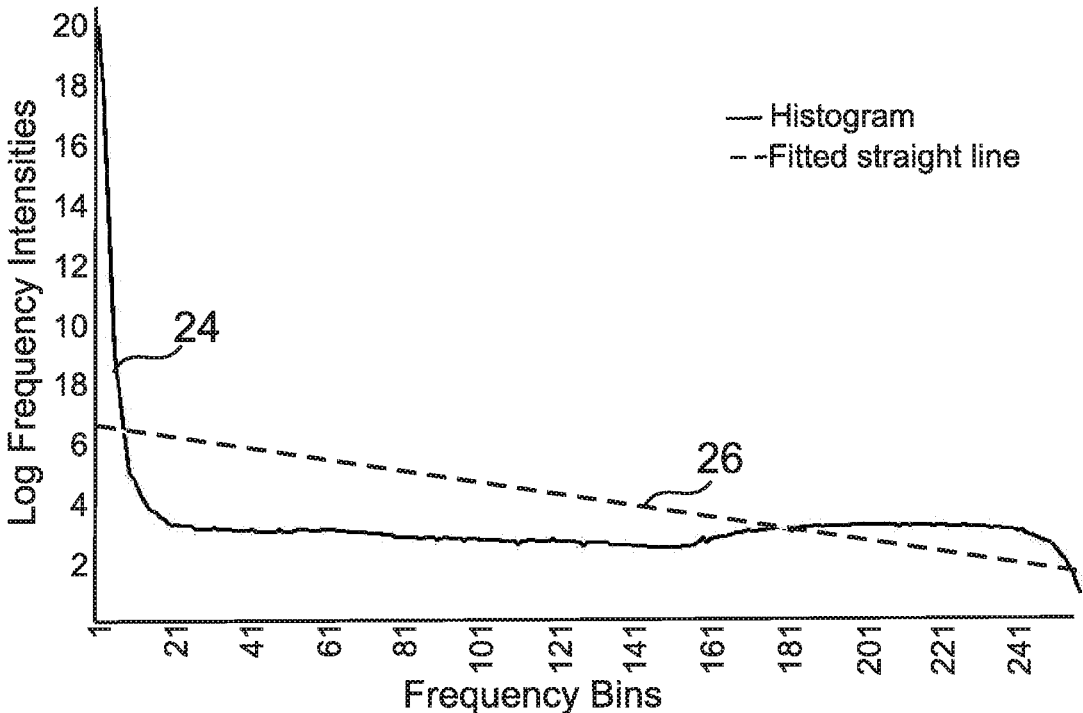
FIG. 7 is an exemplary one-dimensional spectrum (a histogram) generated from FIG. 5, and a straight line fitted on the histogram.

FIGS. 6 and 7 show examples of a one-dimensional frequency spectrum 14 and a further one-dimensional frequency spectrum 24, respectively. The one-dimensional frequency spectrum 14 according to FIG. 6 and the further one-dimensional frequency spectrum 24 according to FIG. 7 are both histograms generated from the two-dimensional frequency spectrum 12 according to FIG. 4 and from the further two-dimensional frequency spectrum 22 according to FIG. 5, respectively. Each of the histograms has bins, in the present case frequency bins, corresponding to frequency ranges, preferably uniform, unisized frequency ranges. The frequency bins can be interpreted as concentric rings around a centre of the two-dimensional frequency spectrum 12 and the further two-dimensional frequency spectrum 22, the histograms according to FIGS. 6 and 7 have frequency bins corresponding to concentric rings having a width of one pixel, thus, each histogram according to FIGS. 6 and 7 have 256 frequency bins. The number of frequency bins thus corresponds to a size of the two-dimensional frequency spectrum 12 and the further two-dimensional frequency spectrum 22, respectively.

Histogram values of the histograms of FIGS. 6 and 7 are determined the following way. First, a respective two-dimensional amplitude spectrum is generated based on the two-dimensional frequency spectrum 12 and the further two-dimensional frequency spectrum 22, respectively. Second, a logarithm of the respective two-dimensional amplitude spectrum is calculated, and then, the histogram values are generated from the logarithm of the respective two-dimensional amplitude spectrum by radial averaging, i.e., for each frequency bins the corresponding histogram value is an average amplitude (intensity) within the frequency range (concentric ring), thus the histogram values are logarithmic frequency intensities (log frequency intensities).

In FIGS. 6 and 7 the frequency bins are denoted by a distance (preferably in pixels) from the centre of the two-dimensional frequency spectrum 12 and the further two-dimensional frequency spectrum 22.

In FIG. 6, a straight line 16 is fitted on the one-dimensional frequency spectrum 14 (a histogram) by way of a linear regression, e.g., by any linear regression method known in the art. A residual, characterizing a quality of the fit, is calculated for the fit, wherein residuals having lower values indicate that the straight line 16 fits well to the one-dimensional frequency spectrum 14, and residuals having higher values indicate that the straight line 16 does not fit so well to the one-dimensional frequency spectrum 14. The residual is preferably divided by a size of the input image 10, for example, by the number of frequency bins, i.e., to generate a blur score value independent of the size of the input image 10. If the input image 10 has sharp details, then the histogram (the one-dimensional frequency spectrum 14) is rather balanced, i.e., its envelope is flat, thus it results in a good linear fit and a residual and blur score value having low values. In case of blurry images, the envelope of the histogram has features, which typically reduces the quality of the linear fit, i.e., it results in a higher residual and a higher blur score value. A clear correlation has been found between the flatness of the envelope and the sharpness of the input image 10. The blur score value calculated based on the residual of the fit is 105 for FIG. 6. In case the residual is divided by the number of bins (which depends on the size of the input image 10), a normalized blur score value can be generated that is independent from the size of the input image 10 and also from the number of histogram bins. The normalized blur score value is 0.41 for FIG. 6, which is the blur score value divided by the number of frequency bins; the histogram of FIG. 6 contains 256 frequency bins. The blur score value and the normalized blur score value are both independent from the actual scene of the input image 10, i.e., the content of the input image 10.

In FIG. 7, a further straight line 26 is fitted on the further one-dimensional frequency spectrum 24 (a histogram) by way of a linear regression, and a residual of the fit is calculated. In the example shown in FIG. 7, the linear regression method that was used for fitting the further straight line 26 on the further one-dimensional frequency spectrum 24 is the same as for fitting the straight line 16 on the one-dimensional frequency spectrum 14 in FIG. 6. A blur score value can also be calculated for the blurred image 20 of FIG. 2. The blur score value for FIG. 7 is 116, which results in a normalized blur score value of 0.45, wherein the blur score value and the normalized blur score value are both calculated the same way as for FIG. 6. As the input image 10 and the blurred image 20 have the same sizes, the histogram of FIG. 7 also has 256 bins.

It can be seen based on a comparison of FIGS. 6 and 7 that the blur score value calculated for a burrier image (e.g., the blurred image 20) is higher than as of a sharper image (e.g., the input image 10), thus, the blur score value can be used to indicate whether an input image 10 is sufficiently sharp.

FIG. 8 shows an evolution of the blur score value as a function of a blur parameter indicating a degree of blurring of an input image 10. A series of blurred images 20 is generated from the input image 10 by blurring, for example, by applying a Gaussian blurring with an increasing blur parameter on the input image 10. The blur parameter is preferably a standard deviation of the Gaussian function that is used for the Gaussian blurring.

Surprisingly, the blur score values of the blurred images 20 are first moderately decreasing, then at around a blur parameter (standard deviation) of 0.4 a sharper decrease is started, and after a blur parameter (standard deviation) of 0.75, a rapid increase is observed. It is to be noted, that sharp images being blurred by a blur parameter below 0.4 can still be considered as sharp, because such a low level of blurring can be hardly seen by a human eye. The observed different effect of blurring, i.e., the sharper decrease and increase of the blur score value can also be used to indicate the sharpness or blurriness of the input image 10. For example, if the input image 10 is sufficiently sharp, i.e., it has a blur score value of around 0.4, then a blurred image 20 that was generated by a blurring (e.g., with a Gaussian blurring having a standard deviation of 0.7) from the input image 10 has a blur score value of 0.32. A difference of the two blur score values generated by subtracting the blur score value of the blurred image 20 from the blur score value of the input image 10 is a positive (non-negative) number (0.8).

However, in case the input image 10 is blurry, e.g., its blurriness is comparable to an effect of a Gaussian blurring having a standard deviation of 0.4 or more, then its blur score value is approximately below 0.39. When this input image 10 is further blurred by a Gaussian blurring having a standard deviation of 0.7, it results in a blurred image 20 which has a blurriness comparable to an effect of a Gaussian blurring having a standard deviation of 1.1 or more. With such a blurred image 20, a blur score value of 0.44 (or higher) can be associated. In this case, the difference of the two blur score values generated by subtracting the blur score value of the blurred image 20 from the blur score value of the input image 10 is a negative number (−0.05).

Based on the above observations, the blurred image 20 can be used in order to determine the blur score threshold value, i.e., the blur score value of the blurred image 20 generated by blurring of the input image 10 can be used as the blur score threshold value. A comparison of the blur score value of the input image 10 and the blur score threshold value determined from the blurred image 20 thus clearly indicated whether the input image 10 is sufficiently sharp.

Preferably, by generating a blurred image 20, an appropriate blur parameter is to be chosen, i.e., a blur parameter that leads to a significant, visible blurring of the input image 10.

In a preferred embodiment, a sharp image is taken and a series of blurred images 20 is generated by blurring, wherein each one of the series of blurred images 20 is generated by applying a series of subsequent blurring, preferably of the same type. Preferably, the series of subsequent blurring is performed by applying different blur parameters that are uniformly distributed over a predetermined range. For example, a Gaussian blurring is used for generating the series of blurred images 20, and each one of the series of blurred images 20 is generated with a Gaussian blurring having different standard deviations, preferably the standard deviations are uniformly distributed in a range of 0.1 to 1.2. Preferably, a blur score value is calculated for each of the series of blurred images 20 according to the invention, i.e., by generating a further two-dimensional frequency spectrum 22 of each blurred image 20, by generating a further one-dimensional frequency spectrum 24 of the further two-dimensional frequency spectrum 22, and by fitting a further straight line 26 on the further one-dimensional frequency spectrum 24, wherein the blur score value is determined based on a residual of the fitting. After calculating the blur score values for each of the blurred images 20, the blur parameter (the standard deviation for Gaussian blurring) corresponding to a minimum of the blur score values of the series of the blurred images 20 is selected. FIG. 8 thus can also be interpreted as a tool to determine an appropriate blur parameter in the second scenario.

According to FIG. 8, in case of Gaussian blurring, the minimum (the smallest) blur score value belongs to a standard deviation of 0.75, thus this can be selected as an appropriate blur parameter for generating the blurred image 20 from the input image 10. Obviously, depending on the number of the different blur parameters used for generating the series of blurred images 20, different blur parameters can be selected. For example, if FIG. 8 would have been constructed by 0.1 or 0.2 blur parameter increments instead of 0.05 blur parameter increments, then the smallest blur score value would belong to a standard deviation of 0.7 or 0.8, respectively, and this blur parameter would be used for generating the blurred image 20 to determine the blur score threshold value. This, however, has no impact on the end conclusion of the method determining whether the input image 10 is sufficiently sharp or not.

The invention also relates to a data processing system comprising means for carrying out the steps of the method according to the invention. The data processing system preferably has an input for inputting an input image 10. Furthermore, the data processing system preferably comprises an image processing system that generates a two-dimensional frequency spectrum 12 from an input image 10. The data processing system preferably comprises means for generating a one-dimensional frequency spectrum 14 from the two-dimensional frequency spectrum 12, which means are preferably part of the image processing system.

The data processing system preferably further comprises a fitting unit for fitting a straight line 16 on the one-dimensional frequency spectrum 14. The fitting unit is preferably configured to determine a residual of the fitting. The data processing system preferably also comprises means for determining a blur score value on the residual of the fitting.

Furthermore, the data processing system preferably further comprises a comparison unit for comparing the blur score value with a blur score threshold value.

The data processing system preferably further comprises a blurring unit, preferably as a part of the image processing system, wherein the blurring unit preferably applies a Gaussian blurring or any other blurring method known in the art to generate a blurred image 20 from the input image 10. Preferably, the blurring unit has an input for a blur parameter characterizing a degree of blurring.

The invention, furthermore, relates to a computer program product comprising instructions which, when the program is executed by a computer, cause the computer to carry out an embodiment of the method according to the invention.

The computer program product may be executable by one or more computers.

The invention also relates to a computer readable medium comprising instructions which, when executed by a computer, cause the computer to carry out an embodiment of the method according to the invention.

The computer readable medium may be a single one or comprise more separate pieces.

The invention is, of course, not limited to the preferred embodiments described in detail above, but further variants, modifications and developments are possible within the scope of protection determined by the claims. Furthermore, all embodiments that can be defined by any arbitrary dependent claim combination belong to the invention.

LIST OF REFERENCE SIGNS 10 input image
10' enlarged detail 12 two-dimensional frequency spectrum
14 one-dimensional frequency spectrum
16 straight line
20 blurred image
20' enlarged detail
22 further two-dimensional frequency spectrum
24 further one-dimensional frequency spectrum
26 further straight line

The invention claimed is:

1. A method for determining whether an input image is sufficiently sharp, comprising the steps of
   providing a blur score threshold value,
   inputting the input image to an image processing system,
   generating, by the image processing system, a two-dimensional frequency spectrum of the input image,
   generating a one-dimensional frequency spectrum from the two-dimensional frequency spectrum,
   fitting a straight line on the one-dimensional frequency spectrum, and
   determining a blur score value based on a residual of the fitting, and considering the input image as sufficiently sharp based on a comparison of the blur score value with the blur score threshold value,
   wherein providing the blur score threshold value comprises making a decision on the basis of empirical data between a first scenario and a second scenario, wherein in said first scenario, the blur score threshold value is a predetermined value, and in said second scenario, the blur score threshold value is determined by the following steps:
       generating a blurred image from the input image,
       generating, by an image processing system, a further two-dimensional frequency spectrum of the blurred image,
       generating a further one-dimensional frequency spectrum from the further two-dimensional frequency spectrum, and
       fitting a further straight line on the further one-dimensional frequency spectrum, wherein the blur score threshold value is based on a residual of the fitting.

2. The method according to claim 1, characterized in that the one-dimensional frequency spectrum is generated from a two-dimensional amplitude spectrum of the two-dimensional frequency spectrum.

3. The method according to claim 2, characterized by calculating a logarithm of the two-dimensional amplitude spectrum, wherein the one-dimensional frequency spectrum is generated from the logarithm of the two-dimensional amplitude spectrum.

4. The method according to claim 2, characterized in that the one-dimensional frequency spectrum is a histogram having bins corresponding to frequency ranges of the two-dimensional frequency spectrum and histogram values for each bin, wherein each histogram value is an average amplitude or an integrated amplitude within the corresponding frequency range.

5. The method according to claim 1, characterized in that the two-dimensional frequency spectrum is centralized, and the one-dimensional frequency spectrum is generated by radial averaging.

6. The method according to claim 1, characterized in that the two-dimensional frequency spectrum of the input image is generated by a two-dimensional Fourier-transform or a two-dimensional wavelet transform.

7. The method according to claim 1, characterized in that the straight line is fitted by a linear regression method.

8. The method according to claim 1, characterized in that in the second scenario the blurred image is generated by a blurring having a blur parameter, and the blur parameter is determined by the following steps:

taking a sharp image, generating a series of blurred images based on the sharp image by applying a series of subsequent blurring, calculating a blur score value for each one of the series of blurred images, and selecting the blur parameter corresponding to a minimum of the blur score values of the series of the blurred images.

9. The method according to claim 1, characterized in that the blurred image is generated by a Gaussian blurring.

10. The method according to claim 8, characterized in that the further two-dimensional frequency spectrum is generated the same way as the two-dimensional frequency spectrum, the further one-dimensional frequency spectrum is generated the same way as the one-dimensional frequency spectrum, and the further straight line is fitted the same way as the straight line.

11. The method according to claim 1, characterized in that the comparison of the blur score value and the blur score threshold value is implemented by generating a difference score value by subtracting the blur score threshold value from the blur score value, wherein difference score values having a positive value or a non-negative value indicate that the input image is sufficiently sharp.

12. The method according to claim 1, characterized in that the comparison of the blur score value and the blur score threshold value is implemented by generating a score ratio by dividing the blur score value with the blur score threshold value, wherein score ratios having a value greater than 1 or not less than 1 indicate that the input image is sufficiently sharp.

13. A data processing system comprising means for carrying out the steps of the method according to claim 1.

14. A non-transitory computer program product comprising instructions which, when the program is executed by a computer, cause the computer to carry out the method of claim 1.

15. A non-transitory computer readable medium comprising instructions which, when executed by a computer, cause the computer to:

provide a blur score threshold value, input the input image to an image processing system, generate a two-dimensional frequency spectrum of the input image, generate a one-dimensional frequency spectrum from the two-dimensional frequency spectrum, fit a straight line on the one-dimensional frequency spectrum, and determine a blur score value based on a residual of the fitting, and considering the input image as sufficiently sharp based on a comparison of the blur score value with the blur score threshold value, wherein the comparison is implemented by generating a score ratio by dividing the blur score value with the blur score threshold value, wherein score ratios having a value greater than 1 or not less than 1 indicate that the input image is sufficiently sharp.

16. The method of claim 5, wherein a frequency corresponding to a zero frequency is arranged in a centre of the two-dimensional frequency spectrum and frequencies increase radially outwards from the centre.

17. The method of claim 8, wherein calculating the blur score value comprises:

calculating the blur score value by generating a further two-dimensional frequency spectrum of each blurred image, by generating a further one-dimensional frequency spectrum of the further two-dimensional frequency spectrum, and by fitting a further straight line on the further one-dimensional frequency spectrum, wherein the blur score value is determined based on a residual of the fitting.

\* \* \* \* \*